United States Patent Office 3,393,882
Patented July 23, 1968

3,393,882
COUPLING DEVICE FOR V.T.O.L. AIRCRAFT
Jean Soulez-Lariviere, La Celle-Saint-Cloud, and René Philippot, Chatenay-Malabry, France, assignors to Nord-Aviation Societe Nationale de Constructions Aeronautiques, Paris, France, a joint-stock company of France
Filed June 6, 1966, Ser. No. 555,564
Claims priority, application France, June 10, 1965, 20,342
5 Claims. (Cl. 244—83)

ABSTRACT OF THE DISCLOSURE

A coupling device for use in aircraft which take off and land vertically, utilizing two tiltable propulsion units, which permits the transmission of piloting orders from the control members to the propulsion units wherein, for example, an action for correction of rolling on the joy-stick should cause an anti-symmetrical variation of the thrust of the propulsion units during vertical flight, whereas in horizontal flight this same action should cause an anti-symmetrical variation of inclination of these same propulsion units. Also the coupling device permits transmission, in accordance with above, of piloting orders between, on the one hand the operating or piloting controls, and on the other hand the transfer members respectively connected to the mechanism permitting the variation of the inclination and the thrust of each of the propulsion units.

---

The present invention relates to a coupling device for aircraft which take-off and land vertically, or V.T.O.L. machines, of the type comprising two tiltable propulsion units, an elevator and piloting controls similar to those of a helicopter.

Flying machines of this type are better known in the stage of design and study than in their actual construction. These studies have shown that in order to ensure the lift and their equilibrium in flight, they must adapte two variable parameters, which are the symmetric or anti-symmetric variation (that is to say of equal absolute values but of opposite sign) of the values of inclination associated or not with the symmetrical or anti-symmetrical variation of the values of the thrust of the two propulsion units, a complementary aciton on the elevator which is applied in phases of flight having a horizontal component.

In addition, the said device should comprise assisting means intended to overcome the force produced by the dynamic couple which occurs during the operation of the propulsion units. Similarly, in order to facilitate the various adjustments which determine the gains resulting from the various speed-increase or speed-reduction gear ratios of the coupling members in different phases of flight, it is necessary to contemplate a mechanism which is relatively simple.

In order clearly to understand the extent of the problem which the present invention proposes to resolve, it is necessary to recall what are the essential conditions in order to permit the lift and equilibrium in flight of the machine considered.

During the phases of vertical take-off, stationary flight or vertical landing, the lift is effected by the thrust of the propulsion units oriented vertically; in the phase of horizontal flight, the lift is ensured by virtue of the lift of the wings of the machine when the propulsion units are horizontal, and in the phases of oblique flight, the lift is obtained by an adequate inclination associated with a suitable thrust of the propulsion units.

The following table will make it easier to show the adaptation which the coupling device according to the invention must achieve between the piloting parameters and the correction conditions necessary to balancing in the case of yawing L, pitching T, and roling R during all the phases of flight.

| | Phases of flight | | | | | | | | | | | | | | | | | |
|---|---|---|---|---|---|---|---|---|---|---|---|---|---|---|---|---|---|---|
| | Vertical | | | | | | | | | Oblique descending | | | Horizontal | | | Oblique climbing | | |
| | Climbing | | | Discending | | | Stationary | | | | | | | | | | | |
| Corrections | L | T | R | L | T | R | L | T | R | L | T | R | L | T | R | L | T | R |
| Variations on propulsion units: | | | | | | | | | | | | | | | | | | |
| Symmetrical inclination | | X | | | X | | | X | | | X | | | X | | | X | |
| Anti-symmetrical | X | | | X | | | X | | | X | X | | | | X | X | X | |
| Anti-symmetrical thrust | | | X | | | X | | | X | | | X | X | | | | | X |

This table summarizes clearly the complexity of the transmission of piloting orders from the control members to the propulsion units. In fact, for example, an action for correction of rolling on the joy-stick should cause an anti-symmetrical variation of the thrust of the propulsion units during vertical flight, whereas in horizontal flight this same action should cause in this case an anti-symmetrical variation of inclination of these same propulsion units.

The present invention has also for its object a coupling device which permits the transmission, in accordance with the law summarized above, of piloting orders between on the one hand the operating of piloting controls and on the other hand the transfer members respectively connected to the mechanisms permitting the variation of the inclination and the thrust of each of the propulsion units.

Another object of the invention is to provide a coupling device in which the operating forces due to the dynamic couples appearing during a change of operating condition are automatically and continuously reduced.

To this end, the coupling device according to the invention is essentially characterized by the fact that it is constituted on the one hand by a group of order-mixing units responding to the function of characteristic movements of the piloting of the machine and of the coupling member necessary for connecting them to each other and to the piloting members of the machine, and on the other hand by respective transfer members for the propulsion units, assisting servo-motors being arranged between the said units and the said transfer members and permitting, during variations of inclination or thrust, the resulting aerodynamic couples to be overcome and thus assisting the piloting of the machine.

In accordance with other characteristic features:

The group of order-mixing units is composed:
of a mixing unit for symmetrical orders for the transformation of pitching and trim orders to general inclination orders of the propulsion unit;
of a mixing unit for anti-symmetrical orders, for the transformation of rolling and yawing orders to orders of differential variation of thrust and inclination between the two propulsion units, the transfer functions depending on the position of the trim control;
and a mixing unit for thrust orders and a mixing unit for information orders, intended to effect, respectively and in all cases, the addition or subtraction between the general thrust or the general inclination on the one hand and the differential thrust or the differential inclination on the other, these results being transmitted to the respective transfer members of the device for each of the propulsion units.

The piloting members comprise an altitude joy-stick for controlling pitching and rolling, a rudder-bar for controlling the yawing movements, a general control acting simultaneously and in the same direction on the thrust of the propulsion unit, and a trim control acting on the general inclination of the propulsion units, while an elevator control member is incorporated in the coupling device and enables the action on pitching to be completed during the phases of flight having a horizontal component.

In accordance with one advantageous form of construction, the coupling members or control-rod system and the order-mixing units of the device only comprise mechanical members for the transmission or transformation of movements, such as rods, levers, cranks, gears, bell-cranks and any other conventional mechanical means.

The two assisting servo-motors, that is to say for the thrust and the inclination, are arranged between the order-mixing units and the transfer members of the coupling device and each comprising two bell crank levers actuated in opposite directions and respectively coupled to two dynamometer couples inserted in the output rods of order transmission, the said dynamometer couples producing electric voltages which respectively excite two magnetic clutches, so that by means of the action of an external driving system, the said bell-cranks are moved until the said dynamometer couples produce identical voltages, that is to say are subjected to similar mechanical forces.

Other advantages and characteristic features of the present invention will be brought out during the course of the description which follows below, reference being made to the accompanying drawings, in which:

FIG. 1 is a general diagram of a V.T.O.L. aircraft of the type comprising two pivoted faired air-screws and an elevator, and shows on the one hand an advantageous and wholly mechanical form of construction of the coupling device according to the invention, arranged between the control members and the order-transfer members, and on the other hand a vectorial illustration of the condition of lift and balancing necessary for piloting the said machine.

Figure 1:
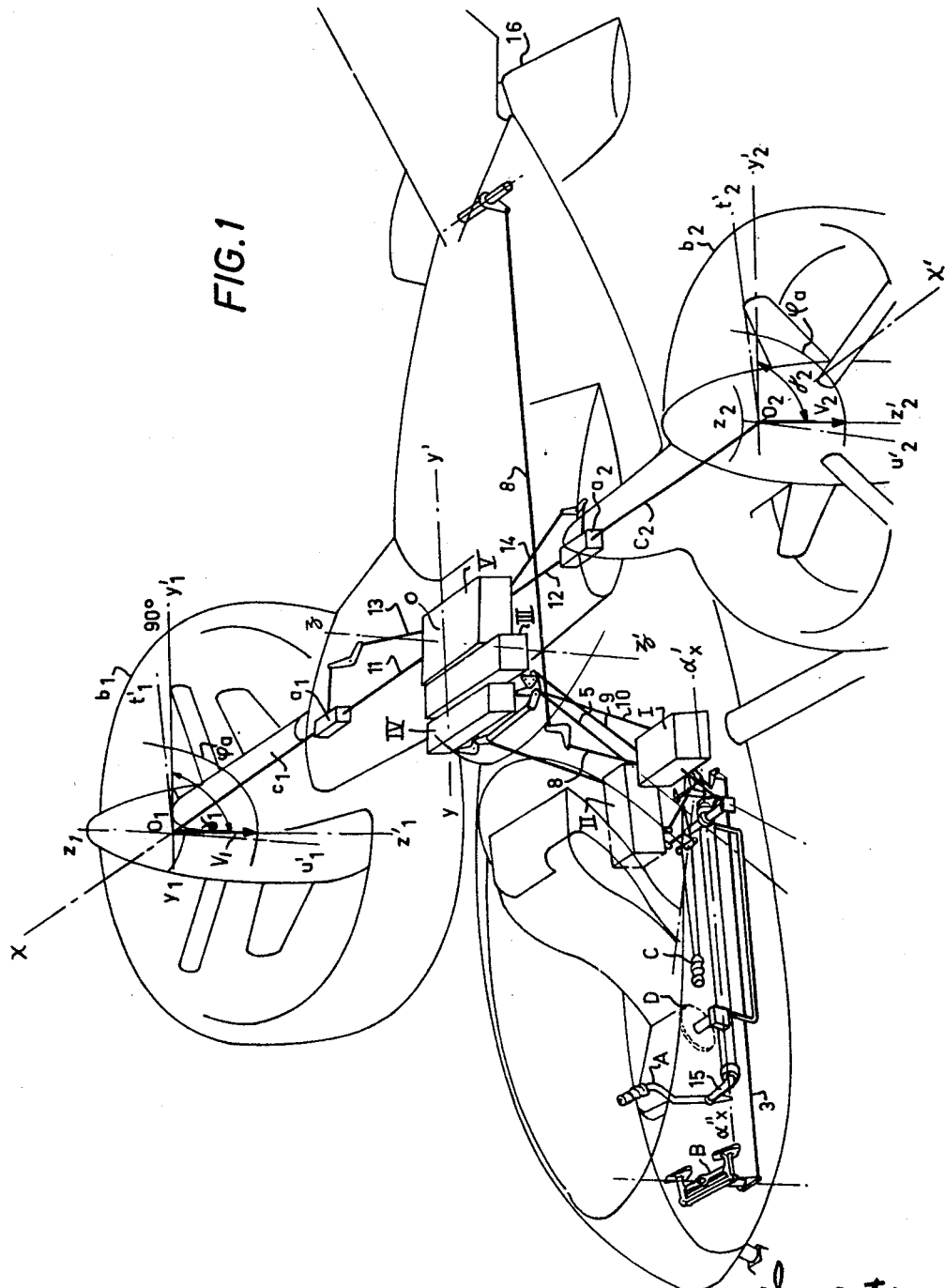

In FIG. 1, the flying machine shown has a longitudinal plane of symmetry defined by the axes $z$–$z'$, $y$–$y'$ respectively vertical and horizontal by definition. At the point O, an axis $x$–$x'$ perpendicular to this plane intercepts at the points $O_1$ and $O_2$ located at equal distances from O, two other planes parallel to the first and which are represented by the axes $z_1$–$z'_1$, $y_1$–$y'_1$ on the one hand and $z_2$–$z'_2$, $y_2$–$y'_2$ on the other. On the axis $x$–$x'$, $O_1$ and $O_2$, which are virtual supporting points, actually represent the points of intersection of the axis $x$–$x'$ with the thrust axes of the propulsion units.

The propulsion units are coupled to the machine by articulation pivots arranged on the axis $x$–$x'$. These pivots serve for the tilting movement of the propulsion units in such manner that considered in the vectorial form, the vectors $$\vec{V}_1 \text{ and } \vec{V}_2$$

representing the thrusts of the propulsion units, sweep out sectors delimited by the extreme positions $O_1t'$, $O_1u'_1$, $O_2t'_2$, $O_2u'_2$, which can respectively exceed $O_1z_1y_1$ and $O_2z_2y_2$. The centre of gravity of the machine is normally located beneath O and in a vertical line with it.

Assuming that the transfer members $a_1$, $a_2$ communicate to the propulsion units $b_1$, $b_2$, modulation orders which cause the respective thrust $$\vec{V}_1 \text{ and } \vec{V}_2$$

and the respective angles of tilt $\gamma_1$, $\gamma_2$ to be varied, it is possible by using the conventions of signs indicated on FIG. 1, to establish all the conditions of lift and balancing necessary for the evolution of the machine.

Thus, if $\varphi_a$ represents at $O_1$ and $O_2$ a fictitious line corresponding to an equality of action between the thrust of a propulsion unit on the one hand and one-half of the force of gravity on the other, it is possible, as a function of all the phases of flight, to vary the vectors $$\vec{V}_1 \text{ and } \vec{V}_2$$

symmetrically or anti-symmetrically by an amount $+\Delta V$ or $-\Delta V$, together with a variation of any angle of inclination $+\Delta\gamma$ or $-\Delta\gamma$, beyond or less than $\varphi_a$, while at the same time remaining within the limits of the possible extreme positions of the vectors $$\vec{V}_1, \vec{V}_2$$

Figure 2:
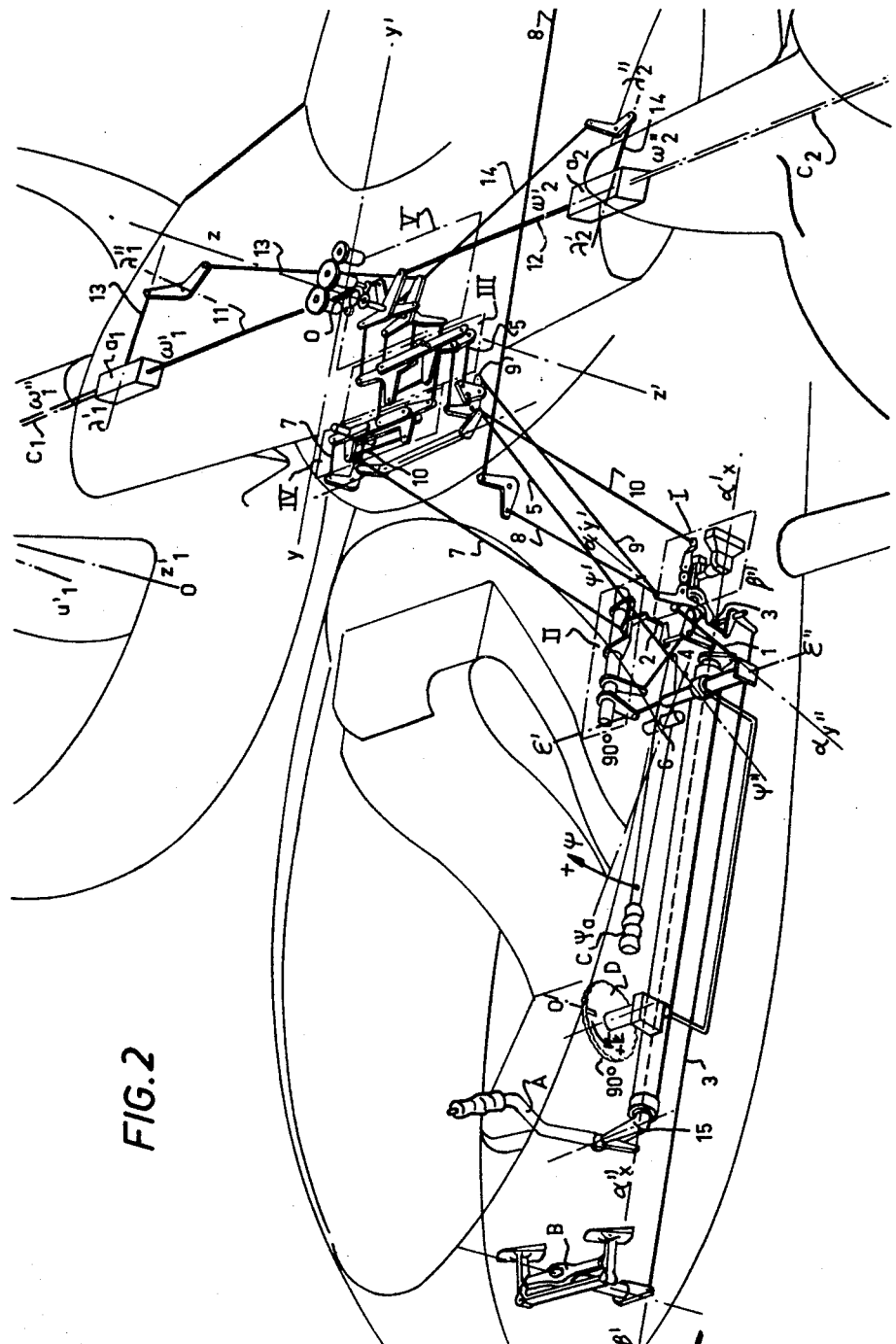
FIG. 2 is a perspective view to a larger scale of the essential parts of the coupling device according to the invention, as shown in FIG. 1.

By means of other conventions of signs indicated in FIG. 1, it is possible to consider movements of the rods of the control rod system such that by coupling a fictitious point on their trajectory of movement to the corresponding control member, there is obtained on the axes terminating on the transfer members $a_1$, $a_2$, algebraical displacements, the sign of which is given in FIG. 2: On the axes $\lambda'\lambda''$: $+\Delta\lambda$ in the direction $\lambda'\lambda''$ and $-\Delta\lambda$ in the direction $\lambda''\lambda'$ which corresponds respectively at a constant thrust V, to an algebraical variation $+\Delta\gamma$ and $-\Delta\gamma$ of the angle of inclination.

Similarly, on the axes $\omega'\omega''$:
$+\Delta\omega$ corresponding to $+\Delta V$ in the direction $\omega'\omega''$
$-\Delta\omega$ corresponding to $-\Delta V$ in the direction $\omega''\omega'$ These displacements are obtained, according to the phase of flight considered, by corresponding displacements of the control members A, B, C and D referred to in detail below and with the following conventions of signs for the variations:

In the direction $\beta'\beta''$: $+\Delta\beta$ and $-\Delta\beta$ in the direction $\beta''\beta'$
Similarly in the direction $\alpha'_x$, $\alpha''_x$, $+\Delta\alpha_x$ and $-\Delta\alpha_x$ in the direction $\alpha''\,\alpha'_x$.

In the similar way, the conventions are deduced for the variations of the other quantities $\alpha_y$, $\psi$ and $\epsilon$, the meanings of which will be indicated below.

Starting from these signs, it is possible to establish a law of transmission between the control members and the transfer members ($a_1$, $a_2$) such that, for all phases of flight, the conditions of lift:

$V > \varphi_a$, $\gamma = 0$ (vertical climbing flight)
$V < \varphi_a$, $\gamma = 0$ (vertical descending flight)
$V = \varphi_a$, $0 < \gamma < 90°$ (vertical stationary flight)
$V < \varphi_a$, $0 < \gamma < 90°$ (oblique descending flight)
$V > \varphi_a$, $\gamma = 90°$ (horizontal flight)
$V > \varphi_a$, $0 < \gamma < 90°$ (oblique climbing flight)

may be effected by the corresponding positions of the piloting members fixing the phase of flight considered and given by:

$\psi > \psi_a$, $\epsilon = 0$
$\psi < \psi_a$, $\epsilon = 0$
$\psi = \psi_a$, $\epsilon = 0$
$\psi < \psi_a$, $0 < \epsilon < 90°$
$\psi > \psi_a$, $\epsilon = 90°$
$\psi > \psi_a$, $0 < \epsilon < 90°$ where $\psi_a$ is the value of $\psi$ which corresponds to $\varphi_a$ for the Control C.

Similarly, the said law of transmission may also be completed in such manner that, for each phase of flight and for corrections on yawing, pitching or rolling, there can be obtained by suitably acting on the said control members, corresponding correcting effects of balancing.

To this end, the table below establishes the desired law of transmission and gives at II, for the conditions of lift and balancing required at I, all the actions to be carried out on the piloting members.

(I) CONDITIONS OF PILOTING

| | Phases of flight | | | | | |
|---|---|---|---|---|---|---|
| | Vertical flight | | | Oblique descending | Horizontal | Oblique climbing |
| | Climbing | Descending | Stationary | | | |
| Conditions of lift | $V > \varphi_a$ $\gamma = 0$ | $V > \varphi_a$ $\gamma = 0$ | $V = \varphi_a$ $\gamma = 0$ | $V < \varphi_a$ $0 < \gamma < 90°$ | $V > \varphi_a$ $\gamma = 90°$ | $V > \varphi_a$ $0 < \gamma < 90°$ |
| Conditions of equilibrium: Yawing | $+\Delta\gamma_1 - \Delta\gamma_2$ or $-\Delta\gamma_1 + \Delta\gamma_2$ $V = C^{st}$ | $+\Delta\gamma_1 - \Delta\gamma_2$ or $-\Delta\gamma_1 + \Delta\gamma_2$ $V = C^{st}$ | $+\Delta\gamma_1 - \Delta\gamma_2$ or $-\Delta\gamma_1 + \Delta\gamma_2$ $V = C^{st}$ | $+\Delta\gamma_1 - \Delta\gamma_2$ and $-\Delta V_1 + \Delta V_2$ or $-\Delta\gamma_1 + \Delta\gamma_2$ and $+\Delta V_1 - \Delta V_2$ | $+\Delta V_1 - \Delta V_2$ or $-\Delta V_1 + \Delta V_2$ $\gamma = C^{st}$ | $+\Delta\gamma_1 - \Delta\gamma_2$ and $-\Delta V_1 + \Delta V_2$ or $-\Delta\gamma_1 + \Delta\gamma_2$ and $+\Delta V_1 - \Delta V_2$ |
| Pitching | $+\Delta\gamma_1 + \Delta\gamma_2$ or $-\Delta\gamma_1 - \Delta\gamma_2$ $V = C^{st}$ $\pm \Delta\rho$ | $+\Delta\gamma_1 + \Delta\gamma_2$ or $-\Delta\gamma_1 - \Delta\gamma_2$ $V = C^{st}$ $\pm \Delta\rho$ | $+\Delta\gamma_1 + \Delta\gamma_2$ or $-\Delta\gamma_1 - \Delta\gamma_2$ $V = C^{st}$ $\pm \Delta\rho$ | $+\Delta\gamma_1 + \Delta\gamma_2$ or $-\Delta\gamma_1 - \Delta\gamma_2$ $V = C^{st}$ $\pm \Delta\rho$ | $+\Delta\gamma_1 + \Delta\gamma_2$ or $-\Delta\gamma_1 - \Delta\gamma_2$ $V = C^{st}$ $\pm \Delta\rho$ | $+\Delta\gamma_1 + \Delta\gamma_2$ or $-\Delta\gamma_1 - \Delta\gamma_2$ $V = C^{st}$ $\pm \Delta\rho$ |
| Rolling | $+\Delta V_1 - \Delta V_2$ or $-\Delta V_1 + \Delta V_2$ $\gamma = C^{st}$ | $+\Delta V_1 - \Delta V_2$ or $-\Delta V_1 + \Delta V_2$ $\gamma = C^{st}$ | $+\Delta V_1 - \Delta V_2$ or $-\Delta V_1 + \Delta V_2$ $\gamma = C^{st}$ | $+\Delta\gamma_1 - \Delta\gamma_2$ and $+\Delta V_1 - \Delta V_2$ or $-\Delta\gamma_1 + \Delta\gamma_2$ and $-\Delta V_1 + \Delta V_2$ | $+\Delta\gamma_1 - \Delta\gamma_2$ or $-\Delta\gamma_1 + \Delta\gamma_2$ $V = C^{st}$ | $+\Delta\gamma_1 - \Delta\gamma_2$ and $+\Delta V_1 - \Delta V_2$ or $-\Delta\gamma_1 + \Delta\gamma_2$ and $-\Delta V_1 + \Delta V_2$ |

(II) ACTION ON THE PILOTING CONTROLS

| | Phases of flight | | | | | |
|---|---|---|---|---|---|---|
| | Vertical flight | | | Oblique descending | Horizontal | Oblique climbing |
| | Climbing | Descending | Stationary | | | |
| Actions on the lift controls | $\psi > \psi_a$ $\epsilon = 0$ | $\psi < \psi_a$ $\epsilon = 0$ | $\psi = \psi_a$ $\epsilon = 0$ | $\psi < \psi_a$ $0 < \epsilon < 90°$ | $\psi > \psi_a$ $\epsilon = 90°$ | $\psi > \psi_a$ $0 < \epsilon < 90°$ |
| Action on the balancing controls: Yawing: $+\Delta\beta$ | $+\Delta\lambda_1 - \Delta\lambda_2$ | $+\Delta\lambda_1 - \Delta\lambda_2$ | $+\Delta\lambda_1 - \Delta\lambda_2$ | $+\Delta\lambda_1 - \Delta\lambda_2$ $-\Delta\omega_1 + \Delta\omega_2$ | $+\Delta\omega_1 - \Delta\omega_2$ | $+\Delta\lambda_1 - \Delta\lambda_2$ $-\Delta\omega_1 + \Delta\omega_2$ |
| $-\Delta\beta$ | $-\Delta\lambda_1 + \Delta\lambda_2$ | $-\Delta\lambda_1 + \Delta\lambda_2$ | $-\Delta\lambda_1 + \Delta\lambda_2$ | $-\Delta\lambda_1 + \Delta\lambda_2$ $+\Delta\omega_1 - \Delta\omega_2$ | $-\Delta\omega_1 + \Delta\omega_2$ | $-\Delta\lambda_1 + \Delta\lambda_2$ $+\Delta\omega_1 - \Delta\omega_2$ |
| | $\omega = C^{st}$ | $\omega = C^{st}$ | $\omega = C^{st}$ | | $\lambda = C^{st}$ | |
| Pitching: $+\Delta\alpha_x$ | $+\Delta\lambda_1 + \Delta\lambda_2$ | $+\Delta\lambda_1 + \Delta\lambda_2$ | $+\Delta\lambda_1 + \Delta\lambda_2$ | $+\Delta\lambda_1 + \Delta\lambda_2$ | $+\Delta\lambda_1 + \Delta\lambda_2$ | $+\Delta\lambda_1 + \Delta\lambda_2$ |
| $-\Delta\alpha_x$ | $-\Delta\lambda_1 - \Delta\lambda_2$ | $-\Delta\lambda_1 - \Delta\lambda_2$ | $-\Delta\lambda_1 - \Delta\lambda_2$ | $-\Delta\lambda_1 - \Delta\lambda_2$ | $-\Delta\lambda_1 - \Delta\lambda_2$ | $-\Delta\lambda_1 - \Delta\lambda_2$ |
| | $\omega = C^{st} \pm \Delta\rho$ | $\omega = C^{st} \pm \Delta\rho$ | $\omega = C^{st} \pm \Delta\rho$ | $\omega = C^{st} \pm \Delta\rho$ | $\omega = C^{st} \pm \Delta\rho$ | $\omega = C^{st} \pm \Delta\rho$ |
| Rolling: $+\Delta\alpha_y$ | $+\Delta\omega_1 - \Delta\omega_2$ | $+\Delta\omega_1 - \Delta\omega_2$ | $+\Delta\omega_1 - \Delta\omega_2$ | $+\Delta\lambda_1 - \Delta\lambda_2$ $+\Delta\omega_1 - \Delta\omega_2$ | $+\Delta\lambda_1 - \Delta\lambda_2$ | $+\Delta\lambda_1 - \Delta\lambda_2$ $+\Delta\omega_1 - \Delta\omega_2$ |
| $-\Delta\alpha_y$ | $-\Delta\omega_1 + \Delta\omega_2$ | $-\Delta\omega_1 + \Delta\omega_2$ | $-\Delta\omega_1 + \Delta\omega_2$ | $-\Delta\lambda_1 + \Delta\lambda_2$ $-\Delta\omega_1 + \Delta\omega_2$ | $-\Delta\lambda_1 + \Delta\lambda_2$ | $-\Delta\lambda_1 + \Delta\lambda_2$ $-\Delta\omega_1 + \Delta\omega_2$ |
| | $\lambda = C^{st}$ | $\lambda = C^{st}$ | $\lambda = C^{st}$ | | $\omega = C^{st}$ | |

In this table, the quantities $\gamma_1$ and $\gamma_2$ or $V_1$ and $V_2$, together with their differential variations $\Delta\gamma_1$ and $\Delta\gamma_2$ or $\Delta V_1$ and $\Delta V_2$ are equal in absolute values.

This table further shows, with regard to the table which precedes it, that all the conditions of correction necessary for the balancing of the machine have been accurately adapted to the piloting parameters.

Referring to FIGS. 1 and 2, there have been shown diagrammatically the usual piloting controls, comprising especially an attitude joy-stick A associated with an auxiliary lever 15. By resultant longitudinal movements along $\alpha'_x$, $\alpha''_x$ this joy-stick controls the pitching movements by symmetrical variation of inclination of the propulsion units on the one hand, and on the other by the consecutive action on the elevator control 16 by means of the coupling 8. This same joy-stick A controls by its lateral displacements consecutive movements along $\alpha'_y$, $\alpha''_y$ which produce an action on rolling by means of the coupling device described below. A conventional rudder-bar B enables the yawing movements to be controlled by the effect of displacements along $\beta'\beta''$, while a general control C, represented by a lever and checked by its angular position $\psi$, acts simultaneously and symmetrically on the thrust of the propulsion units $b_1$, $b_2$.

Finally, a trim control D, referenced by its angular position $\epsilon$ and represented in Figs. 1 and 2 by a moving disc, acts on the inclination of the propulsion units. Generally speaking, the controls C and D may be considered as determining the conditions of lift of the machine, that is to say of the phase of flight, while the controls A and B ensure by their movements the balancing corrections necessary in all the phases considered.

Figure 3:
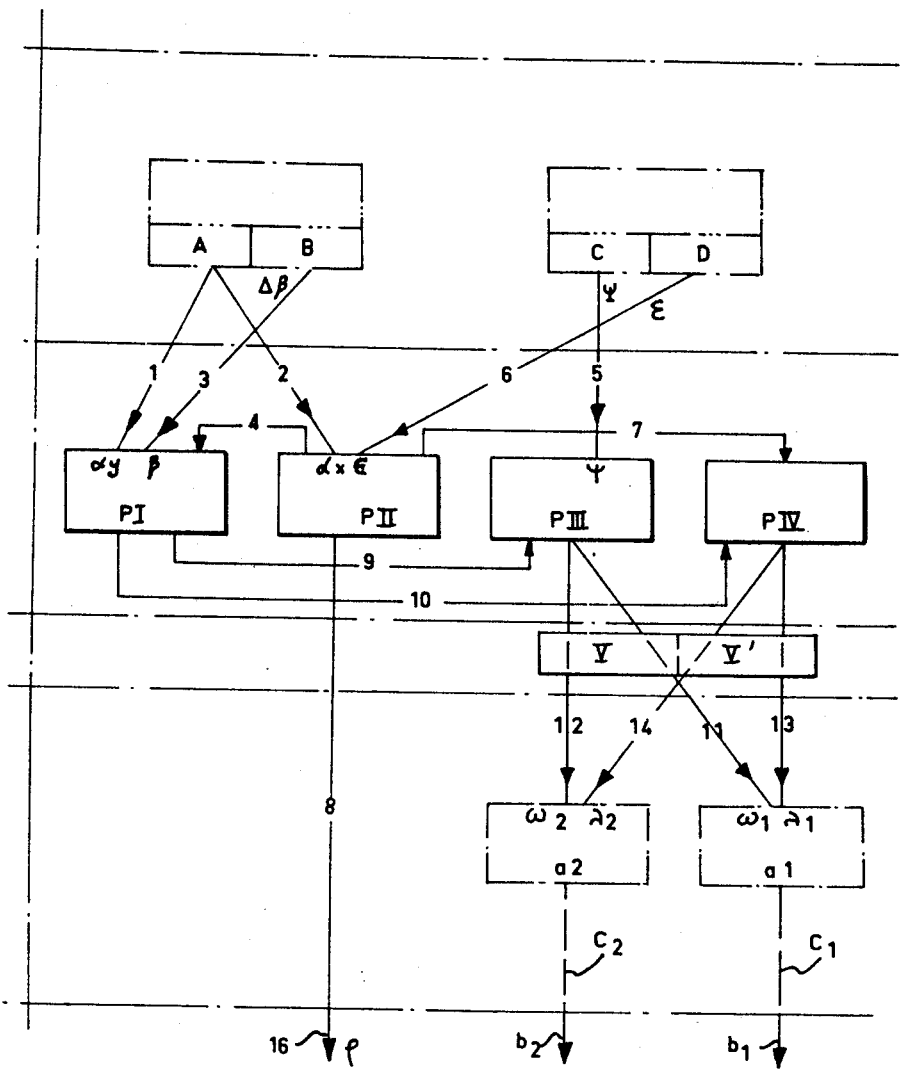
FIG. 3 is a synoptic diagram showing the functional coupling between the various members of the machine shown in FIG. 1.

FIG. 3, which represents a functional diagram of the device according to the invention, indicates which connections are necessary to carry out the functions represented in the preceding table.

In the advantageous form of construction of the device according to the invention shown in FIGS. 1 and 2 and 4 to 8, a device of this kind only comprises purely mechanical coupling, transmission-control and movement-transformation members. In fact, such a form of non-limitative construction has great safety of operation as compared with couplings which utilize electrical, electro-mechanical, hydraulic or pneumatic devices.

It will be shown below that the mechanical coupling device forming the object of the present invention permits on the one hand a suitable transmission of piloting orders by ensuring perfect agreement between the conditions I and II of the above table, and on the other hand, the adaptation of the assisting servo-motors may reduce the operating forces encountered on the controls in consequence of the dynamic couples resulting from the operation of the propulsion units during variations of inclination or thrust.

Figure 4:
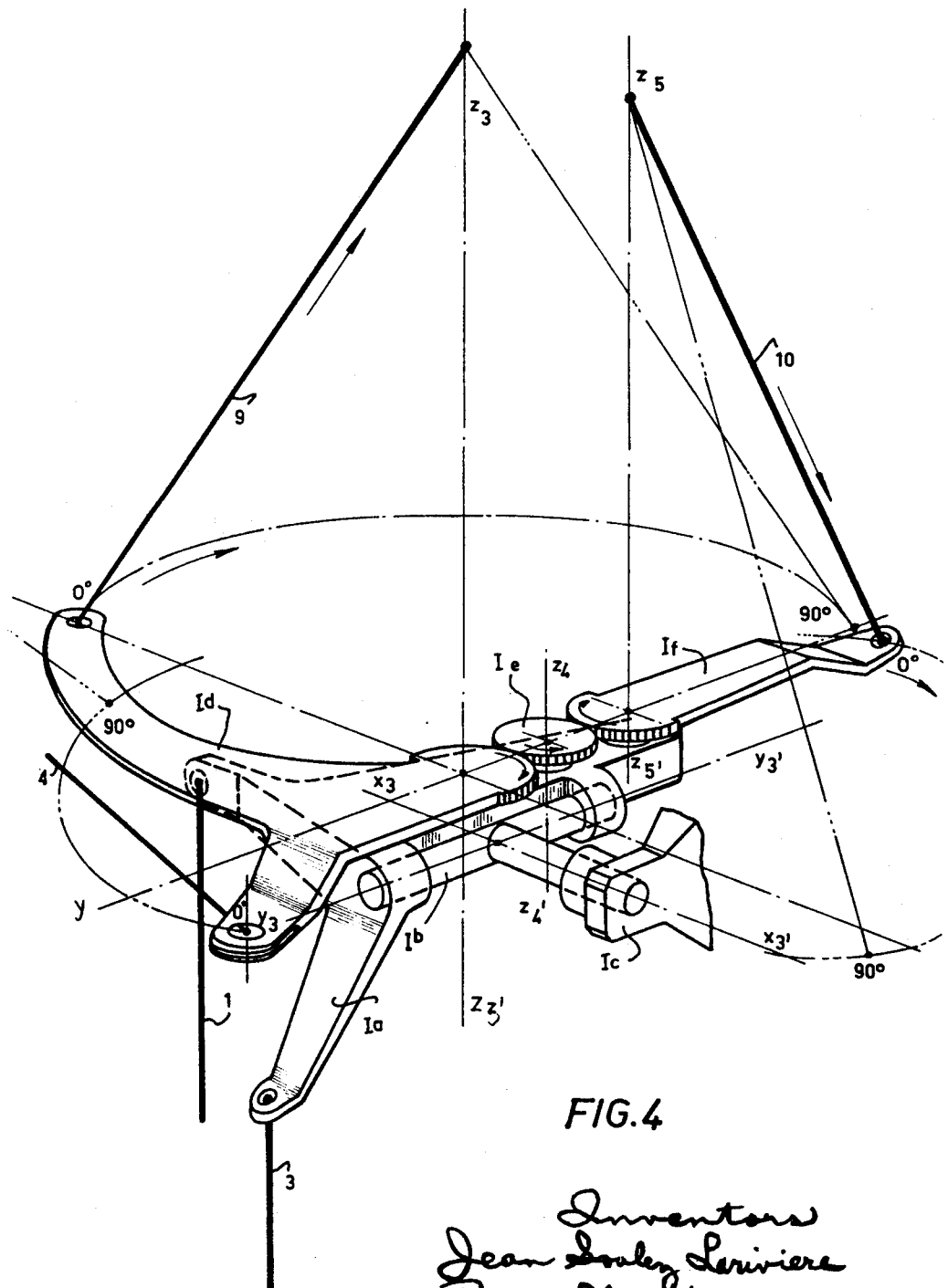
FIGS. 4, 5, 6 and 7 are diagrams showing respectively in perspective a form of possible construction of the order-mixing units, anti-symmetrical I, symmetrical II, thrust III and inclination IV.

The unit PI shown in FIG. 4 is essentially constituted by a mobile base Ia, actuated by a cross-pin Ib about two axes at right angles $y_3$–$y'_3$ and $x_3$–$x'_3$.

The cross-pin Ib pivots about the axis $x_3$–$x'_3$ in a fixed member Ic. The base Ia is mechanically coupled by the rods 1 and 3 respectively to the joy-stick A for the control of the variations $\Delta\alpha_y$ and to the rudder-bar B for controlling the variations $\Delta\beta$. On the base Ia are arranged three moving parts Id, Ie, If pivoting respectively about the axes $z_3$–$z'_3$, $z_4$–$z'_4$, $z_5$–$z'_5$, at right angles to the plane zOy. The parts are arranged in such manner that by means of an appropriate tooth system, they may be enabled to drive each other. The part Id is connected on the one hand by the rod 4 to the unit P II and on the other hand by the rod 9 to the unit P III.

The extremities of the rods 9 and 10 terminate respectively on the axes $z_3$–$z'_3$ and $z_5$–$z'_5$, and the member If is coupled by the rod 10 to the mixing unit P IV.

Figure 5:
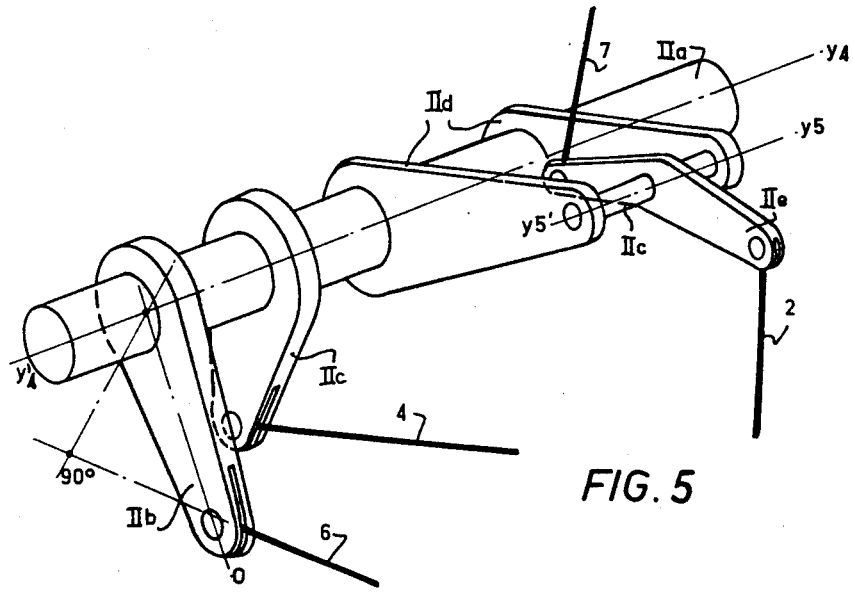

The unit P II of FIG. 5 is essentially constituted by a shaft IIa pivoting about an axis $y_4$–$y'_4$ which is assumed to be fixed. Crank-arms IIb and IIc rigidly fixed on the shaft are connected to rods 4 and 6, respectively fixed to the Unit P I and to the trim control D which controls the variations $\Delta\epsilon$. On the other hand, a system IId comprises two crank-arms fixed to IIa and carries a lever IIc adapted to pivot about an axis $y_5$–$y'_5$ parallel to $y_4$–$y'_4$. This lever receives two rods 7 and 2 which are respectively fixed to the unit P IV and the joy-stick A in its control of the variation $\Delta\alpha_x$.

The unit P III (Fig. 6) is essentially constituted by a part IIIa pivoted by a spindle IIIb about the axis $z_6$–$z'_6$ which is fixed by definition. A bell-crank lever IIIc pivoting about the axis $z_6$–$z'_6$ actuates on the one hand through the rod 9' the T-shaped lever IIId, pivoted about the axis $z_7$–$z'_7$ and on the other hand by the rods 11 and 12, actuates the transfer members $a1$ and $a2$ through the servo-motors V and V'.

Figure 6:
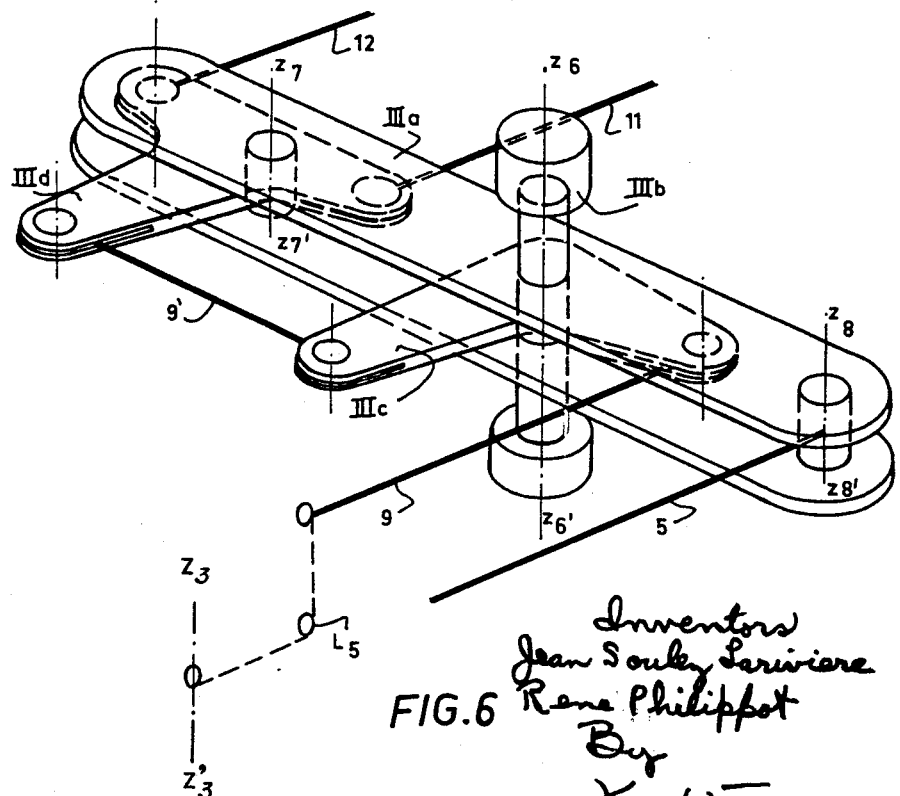

The lever IIIc is coupled by the rod 9 to the unit I, for example, through the intermediary of an additional lever $L_5$, shown diagrammatically in FIG. 6. The part IIIa is coupled by the rod 5 and, by means of the pivot along $z_8$–$z'_8$, to the thrust lever C which controls the variations $\Delta\psi$.

Figure 7:
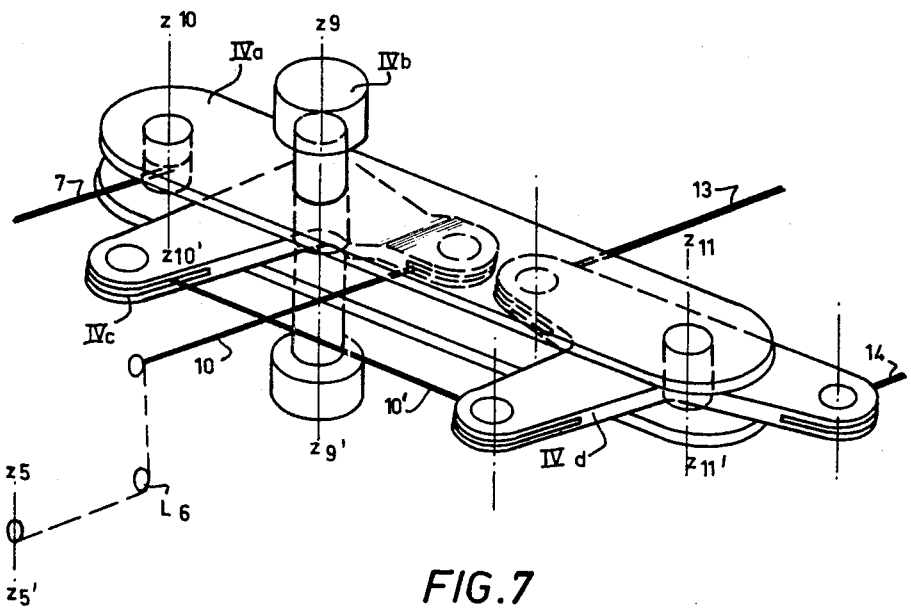

The unit IV shown in FIG. 7, is essentially constituted by a part IVa, pivoted on a spindle IVb about an axis $z_9$–$z'_9$, fixed by definition. A bell-crank lever IVc, pivoted on $z_9$–$z'_9$, acts on the rod 10' to control the T-shaped lever IVd, pivoting about $z_{11}$–$z'_{11}$ and coupled by the rods 13 and 14 to the transfer members $a1$ and $a2$ through the servo-motors V and V'. The lever IV is coupled by the rod 10 to the unit P I, for example through the intermediary of an additional lever $L_6$. The part IVa is connected to the unit II by the rod 7, through the intermediary of the pivot along $z_{10}$–$z'_{10}$.

Figure 8:
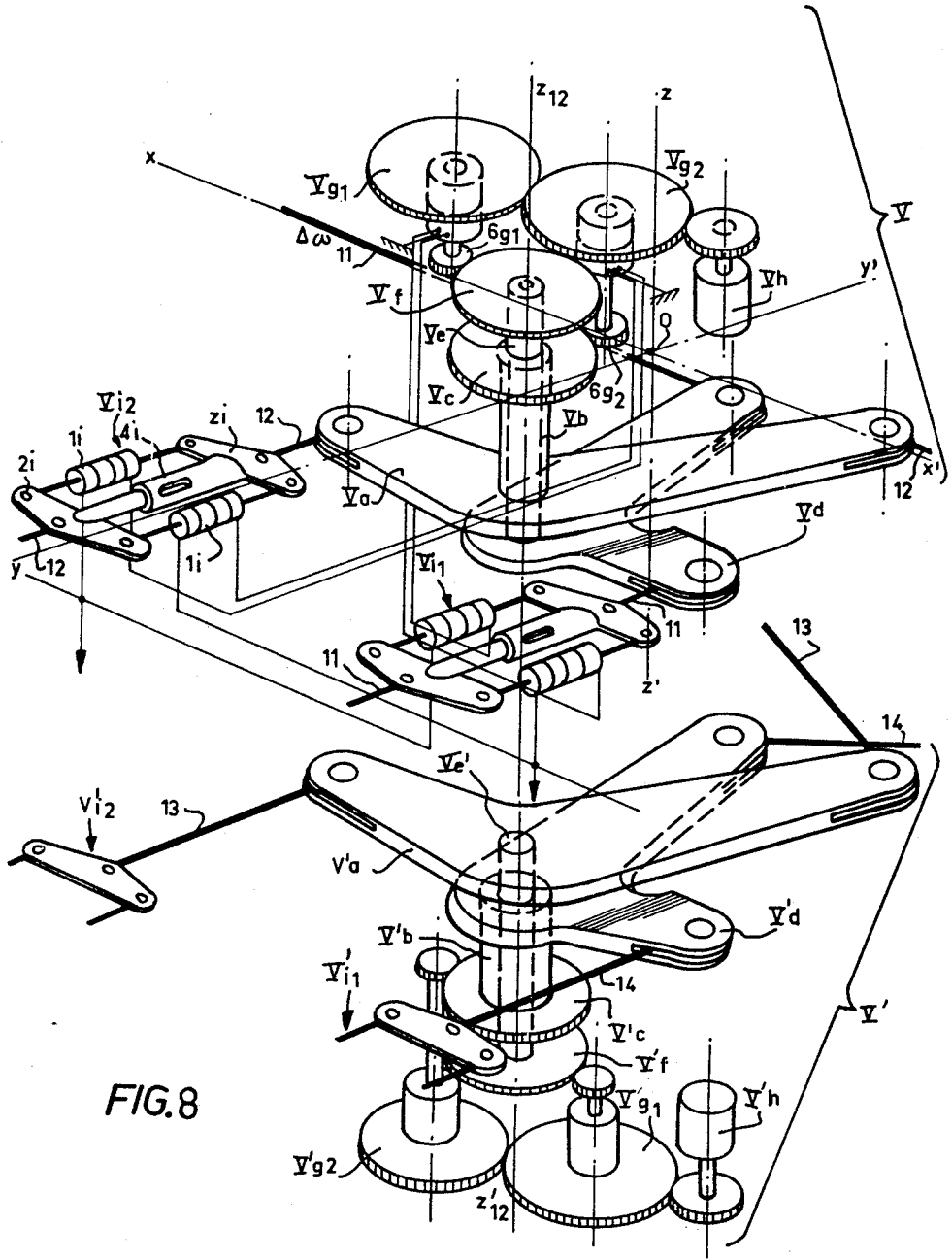
FIG. 8 shows a perspective view of one possible form of construction of the two assisting servo-motors V, V' for the thrust and inclination respectively.

The servo-motors shown in FIG. 8 consist of two units, of which one V is inserted in the path of the rods 11 and 12 and the other V' is inserted in the path of the rods 13 and 14. The unit V is made-up on the one hand of a part Va fixed to a sheath or sleeve Vb, and a gear Vc, the whole pivoting about an axis $z_{12}$–$z'_{12}$ fixed by definition, and on the other hand of another part Vd rigidly fixed to a spindle Ve and a gear-wheel Vf, the whole pivoting about the axis $z_{12}$–$z'_{12}$.

Similarly, the unit V' is made-up on the one hand of a part V'a rigidly fixed to a sheath or sleeve V'b and a gear V'c, the whole pivoting about the axis $z_{12}$–$z'_{12}$ fixed by definition, and on the other hand of another part V'a fixed rigidly to a pin V'e and to a gear-wheel V'f, the whole unit pivoting along the axis $z_{12}$–$z'_{12}$.

Figure 9:
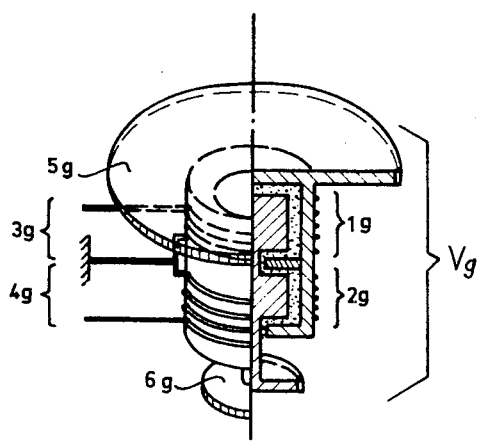
FIG. 9 is a detail view in perspective and in partial cross-section of a double magnetic clutch which can be employed in each of the assisting servo-motors shown in FIG. 8.

The gear-wheels Vf, V'f, Vc, V'c are coupled to identical mechanisms Vg (FIG. 9). These mechanisms are composed of two magnetic powder clutches 1g and 2g for example, excited by two separate electric circuits 3g and 4g. The excitation of the clutches fixes the driving portion 5g to the driven portion 6g to a greater or less extent. The driving portions 5g are respectively engaged with the gears Vf, V'f and Vc, V'c.

From the arrangement of these various mechanisms, it is clear from reference to the two preceding tables of the present text and from FIGS. 1, 2, 4, 5, 6, 7 and 8, in which the machine is shown in a position on the ground, that the lift of this machine will be obtained in all phases of flight, since:

(1) In the vertical climbing phase of flight, in which C will come into the position $\psi > \psi_a$ and D to the position $\epsilon = 0$, it can be seen from the drawings that on the one hand the rod 5 will have pushed the part IIIa which it will have rotated about the axis $z_6$–$z'_6$; that the rods 11 and 12 will have been pushed and will have generated through the unit V, actions on $a_1$ and $a_2$ such that the movements, which are furthermore equal, are then $+\Delta\omega_1$ and $+\Delta\omega_2$ and causing consequently $+\Delta V_1$ and $+\Delta V_2$ in order that $V > \varphi_a$. The position of D which brings $\epsilon = 0$ will be such that at O the crank-arm IIb and the levers Id and If will bring $\gamma = 0$.

(2) In the vertical descending phase of flight, C will have changed its position, and will be rotated in a position $\psi < \psi_a$, resulting in a reversal of the preceding movements, such that $-\Delta\omega_1$ and $-\Delta\omega_2$ will produce $-\Delta V_1$ and $-\Delta V_2$ in order that $V < \varphi_a$, D will always be arranged so that $\gamma = 0$.

(3) In the stationary phase of flight, C will be in position such that $\psi = \psi_a$ produces for this reason $V = \varphi_a$, while D remains such that $\gamma = 0$.

(4) In the oblique climbing phase of flight, C will be in a position $\psi > \psi_a$ causing $V = \varphi_a$ and the displacement of V resulting in $0 < \epsilon < 90°$, will cause in its turn, through the intermediary of a jack or any other mechanism, rotation of IIb from 0 towards 90°, by virtue of the thrust of the rod 6. This rotation of the shaft IIa will produce a tractive pull on the rod 4 which, due to the rotation of 11c, will produce a movement of the levers Id and If. Furthermore, this rotation will produce a tractive force on the rod 7 due to the fact that, under the action of the rotation of the crank-arm 11d, the lever IIc will have a tendency to rotate about $y'_5$ in the direction opposite to the direction of rotation of 11d, the rod 2 being in principle fixed. In addition, the tractive pull of the rod 7 will cause rotation of the part IVa about the axis $z_9$–$z'_9$ acting by thrust on the rods 13 and 14, which act through the unit V' to produce equal movements on the $\lambda$ axes, such as $+\Delta\lambda_1$ and $+\Delta\lambda_2$ which will have the results $0 < \gamma < 90°$.

(5) In the oblique descending phase of flight, C will be located in a position $\psi < \psi_a$ causing $V > \psi_a$ and the movement of D will result in $0 < \gamma < 90°$ under the same conditions as previously.

(6) In the horizontal phase of flight, C will be in a position $\psi > \psi_a$ resulting in $V < \psi_a$ and the movement of D bringing $\gamma$ towards 90° will produce, by tractive force on the rods 13 and 14, equal movements $+\Delta\lambda_1$ and $\Delta\lambda_2$ resulting in $\gamma = 90°$.

Similarly, the balancing of the machine will also be achieved since, when considering the corrections for each phase of flight already examined:

During vertical flight in the climbing, descending or stationary phase:

Yawing will be corrected when the rod 3, pushed according to $+\Delta\beta$ by the rudder-bar B, causes a pivotal movement about the axis $x_3$–$x'_3$ of the part Ia which, in consequence, will move the lever If which acts in its turn by pushing the rod 10. This latter rod will act in such manner that the rotation of the bell-crank lever IVc about the axis $z_9$–$z'_9$ produces rotation of IVd, which causes the rod 13 to be pulled and the rod 14 to be pushed. The movement of these rods to a1 and a2 will be such that the respective displacements will then be $+\Delta\lambda_1$ and $-\Delta\lambda_2$. The correction $-\Delta\beta$ will naturally produce the opposite effect $-\Delta\lambda_1 + \Delta\lambda_2$. On the other hand, the action on $\omega$ will be zero, giving $\omega = $ constant.

Pitching will be corrected when the joy-stick pushed by $+\Delta\alpha_x$ pushes on the rod 2 to actuate the lever IIe which pivots about $y_5$–$y'_5$ and pulls on the rod 7 so as to cause rotation of the part IVa about $z_9$–$z'_9$, which acts in its turn to push the rods 13 and 14. These rods produce movements to a1 and a2, the displacements of which will be respectively in the same direction $+\Delta\lambda_1$ and $+\Delta\lambda_2$. The correction $-\Delta\alpha_x$ will naturally produce the opposite effect $-\Delta\lambda_1$, $-\Delta\lambda_2$, and the action $\omega$ being null will cause $\omega$ to remain constant.

Rolling will be corrected when the rod 1, pushed according to $+\Delta\alpha_y$ by the action of the lever 15 operated by the joy-stick, causes the part Ia to pivot about the axis $y_3$–$y'_3$, thereby driving the part Id which pushes the rod 9 so as to act along $z_3$–$z'_3$ on the part IIIc so as to operate by pushing the rod 11 and pulling the rod 12, in order to produce movements in a1 and a2 such that the displacements are then $+\Delta\omega_1$, $-\Delta\omega_2$, the correction $-\Delta\alpha_y$ naturally producing the opposite effect $-\Delta\omega_1$, $+\Delta\omega_2$, and the action on $\lambda$ being zero, thus keeping $\lambda$ constant.

During flight in the horizontal phase:

Yawing will be corrected when the rod 3, pulled following $+\Delta\beta$ by the rudder-bar B causes a pivotal movement about the axis $x_3$–$x'_3$ of the part Ia which in consequence will move the lever Id (which has previously come into the 90° position), acting in its turn by driving the rod 9. This latter rod will act in such manner that the rotation of the bell-crank lever IIIc about the axis $z_6$–$z'_6$ produces rotation of IIId, causing the rod 12 to be pulled and the rod 11 to be pushed. The movement of these rods in a1 and a2 will be such that the respective displacements will be $+\Delta\omega_1$, $-\Delta\omega_2$. The correction $-\Delta\beta$ will naturally produce the opposite effect $-\Delta\omega_1$, $+\Delta\omega_2$. On the other hand, the action on $\lambda$ will be zero, so that the value of $\lambda$ is constant.

Pitching will be corrected when the control rod pushed by the joy-stick following $\Delta\alpha_x$ applies a push on the rod 2. The lever IIe, pivoting about the axis $y_5$–$y'_5$ acts by pulling the rod 7 so as to cause the part IVa to rotate about $z_9$–$z'_9$ acting in its turn by driving the rods 13 and 14. The latter will produce in a1 and a2 movements of which the displacements will be respectively $+\Delta\lambda_1$, $+\Delta\lambda_2$.

The correction $-\Delta\alpha_x$ will naturally produce the opposite effect $-\Delta\lambda_1$, $-\Delta\lambda_2$ and the action on $\omega$ being zero, the value of $\omega$ will be constant. On the other hand, the joy-stick will act at the same time by pulling on the rod 8 which will control the elevator 16, by acting on the lever 15 in such manner that the displacements are $+\Delta\alpha_x$ corresponding to $+\Delta\rho$, and $-\Delta\alpha_x$ corresponding to $-\Delta\rho$.

Rolling will be corrected when the rod 1, pulled following $+\Delta\alpha_y$ by the action of the lever 15 operated by the joy-stick A causes the part Ia to pivot about the axis $y_3$–$y'_3$, thus actuating the part If (which has previously come into the 90° position) which pulls the rod 10 so as to act on the part IVc, in order to drive and push the rod 13 and by pulling the rod 14 in order to produce movements in a1 and a2 such that the respective displacements are then $+\Delta\lambda_1$, $-\Delta\lambda_2$. The correction $-\Delta\alpha_y$ will naturally produce the opposite effect $-\Delta\lambda_1 + \Delta\lambda_2$, and as the action on $\omega$ is zero, the value of $\omega$ will be constant.

During flight in the oblique descending or climbing phase:

Yawing will be corrected when the thrust of the rod along $+\Delta\beta$ by the rudder bar B causes the part Ia to pivot about the axis $x_3$–$x'_3$ which in consequence will operate the lever Id and the lever If and these levers will then be located in proportional angular positions (as a result of the equality of the radii of the toothed portions) situated between 0 and 90°. These levers simultaneously operate by pulling the rods 9 and 10 which cause a pivotal movement of the parts IIIc, IVc and IIId, IVd about the axes $z_6$–$z'_6$ and $z_9$–$z'_9$ so as to pull the rods 13–11 on the one hand and to push the rods 14–12 on the other. These movements will finally produce in a1 and a2 respectively, displacements $+\Delta\lambda_1$, $-\Delta\omega_1$, and $-\Delta\lambda_2$, $+\Delta\omega_2$. The inverse correction $-\Delta\beta$ will naturally produce the opposite effect in a1, $-\Delta\lambda_1$, $+\Delta\omega_1$, and $+\Delta\lambda_2$, $-\Delta\omega_2$ in a2. Pitching will be corrected in the same way as for the phase of horizontal flight.

Rolling will be corrected when the rod 1, pulled following $+\Delta\alpha_y$ by the action of the lever 15 operated by the joy-stick causes the part Ia to pivot about the axis $y_3$–$y'_3$, actuating the rods 9 by pushing and 10 by pulling, according to the proportional angular position of the levers Id and If (located between 0 and 90°), in such manner that the actions of these rods bring the levers IIIc, IIId and IVc, IVd to act on the rods 12, 14 and 11, 13 in order that the movements on a1 and a2 give respectively the displacements $+\Delta\omega_1$, $+\Delta\lambda_1$ in a1 and $-\Delta\omega_2$, $-\Delta\lambda_2$, in a2. In the phase of oblique rising or descending flight, the rod 4 (FIG. 4) is temporarily fixed and serves as a bearing for the mobile unit. Consequently, if rod 1 is actuated in the indicated direction of the arrow, all of the other movable parts will be displaced in the respective directions indicated by the arrows. Rod 9 is thus pushed and rod 10 pulled. The inverse correction $-\Delta\alpha_y$ would naturally produce the opposite effect $-\Delta\omega_1$, $-\Delta\lambda_1$, and $+\Delta\omega_2$, $+\Delta\lambda_2$.

Comparison of the results thus obtained with the foregoing table makes it possible to show that perfect agreement in the transmission between the orders coming from the control members and the orders which terminate at the transfer members $a1$ and $a2$ for transmission to the propulsion units, is effectively obtained by the mechanical coupling device which forms the object of the present invention, and this is true over the whole extent of the range of stabilization and balancing and for all phases of flight.

In addition, it will now be shown how the servo-motors V and V′ of FIG. 8, which are incorporated in the device according to the invention, will permit the piloting of the machine to be assisted.

When it is desired to place a piloting control in such manner that it registers a control order different from that which it registered previously, for example during an abrupt correction for rolling ($-\Delta\alpha_y$) in an oblique phase, there is immediately applied to the said control an adaptation force resulting from the reactions due to the dynamic couples produced by a change of thrust and/or inclination of the propulsion units.

A more detailed analysis of the operation of a servo-motor such as that of the unit V of FIG. 8 for example, will more clearly explain the function of assistance which is attributed to each servo-motor.

The aircraft such as that shown by way of example in FIG. 1, is provided in fact with propulsion units consisting of two faired air-screws, and it is known that a control of variation of thrust should be effected by action on the pitch control. Furthermore, by reason of the centrifugal torsion couple on the said air-screws, the two bell-crank levers $Va$ and $Vd$ (FIG. 8) at the outputs of the servo-motors P V will be actuated in opposite directions with respect to each other. The two dynamometers $Vi_1$, $Vi_2$, inserted in the paths of the rods 11 and 12 being then also compressed, will then send to the corresponding magnetic clutches: $Vi_1$ to $Vg_1$ and $V'i_1$ to $Vg_2$, equal electrical voltages, in such manner that the forces due to the air-screw are balanced.

If a variation order $-\Delta\alpha_y$ thus appears, involving for example a variation $-\Delta\omega_1$ and $+\Delta\omega_2$, that is to say an increase on the left and a reduction on the right of the tension of the rods 11 and 12, this will result in a tendency to rotation in a clockwise direction of the bell-crank lever $Va$, and a rotation of the bell-crank lever $Vd$ in the same direction. The effect resulting on IIIc is then a clockwise rotation: the rod 12 is further compressed whereas the rod 11 expands.

The force of the servo-motor to be applied in order to obtain a clockwise rotation of the bell-crank lever $Va$ must be greater than the force due to the centrifugal torsion of the air-screw. To this end, the driving member (of any origin, an electric motor for example) $Vh$, engaged with the units $Vg_2$ and $Vg_1$ will supply the necessary torque. As the clutch $Vg_1$ is the most excited by reason of the reduction of the electrical resistance of the carbon discs $1i$ of the dynamometer $Vi_1$, which is more compressed than $Vi_2$, this clutch will have a tendency to increase the rigidity of coupling between the parts $5g_1$ and $6g_1$ (see FIG. 9) resulting for this reason in an increase of the assistance couple between $Vg_2$ and $Vc$. The contrary result will be produced naturally between $Vg_2$ and $Vc$ in consequence of the de-excitation of $Vg_2$ due to the increase of the electrical resistance of $Vi_2$, which is less compressed than $Vi_1$.

The movement of the bell-crank levers $Va$ and $Vd$ continues until the dynamometers $Vi_1$ and $Vi_2$ are also compressed, this resulting in an equality of the electrical resistances of the carbon discs.

On the other hand, in the case of a general pitch variation control (that is to say symmetrical), $+\Delta\omega_1$ and $+\Delta\omega_2$, due to the thrust of the rod 5, the operation of the servo-motor would be similar, except that the dynamometers would be equally compressed or expanded by the action of the driving member $Vh$, resulting in movements in opposite directions of the bell-crank levers $Va$, $Vd$, until the equilibrium is restored.

For the purposes of safety, two magnetic clutches have been arranged in parallel on the same shaft in FIG. 8, and are supplied from two generators which are independent with respect to each other, and this is the case for each dynamometer.

It is quite obvious that the same principle of assistance as that supplied by the unit V of FIG. 8 could be applied as a whole to the unit V′ during an inclination variation control of the propulsion units.

The description given by way of example in the present text, of a form of construction in accordance with the coupling device is constituted by mechanical units: anti-symmetrical, symmetrical, thrust and inclination, and by two assisting servo-motors for the variation of thrust and inclination, all these being in appropriate communication, has clearly brought out the fact that the piloting orders are accurately transmitted to the propulsion units, following the laws defined in the two tables given above, and that the assistance to piloting has actually been effected when a variation of thrust and/or of inclination has appeared.

It will of course be understood that the present invention has only been described and shown purely by way of explanation and not in any limitative sense, and that any modifications may be made thereto without departing from its scope.

In particular, other assemblies with mechanical or electro-mechanical, pneumatic or hydraulic members may be utilized inside the order-mixing units, and other forms of coupling may be used between the said units provided that the above-defined law of transmission is complied with.

The servo-motors may be arranged at any desired point of the coupling and may be of different internal design.

Finally, it is possible to adapt to the coupling device according to the invention, subsidiary means such as an automatic pilot or a remote-control system, on condition that the said means do not modify the law of transmission of the order by the coupling device.

We claim:

1. A coupling device for an aircraft of the type which take-off and land vertically, said aircraft comprising at least two tiltable propulsion units operated by piloting controls constituted by an attitude joy-stick for the control of pitching and yawing, a rudder bar for the control of yawing movements, a general control acting simultaneously and in the same direction on the thrust of the propulsion units, a trim control acting on the general information of the propulsion units and an elevator control incorporated in the coupling device and permitting action on pitching in the phases of flight having a horizontal component to be completed, said coupling device comprising:

a group of order-mixing units adapted to the function of movements defining the piloting of said aircraft, and comprising a symmetrical order-mixing unit for the transformation of the pitching and trim orders to orders of general inclination of the propulsion units, an anti-symmetrical order-mixing unit for the transformation of the orders of rolling and yawing to order of differential variation of thrust and inclination between the two propulsion units, the transfer functions depending on the position of the trim control, a thrust order-mixing unit and an inclination order-mixing unit intended to carry out respectively and in all cases the addition or subtraction between the general inclination on the one hand, and the differential thrust or the differential inclination on the other, these results being transmitted to the respective transfer members of said device for each of said propulsion units;

coupling members between said order-mixing units and between said units and said piloting controls of the aircraft;

respective transfer members for the propulsion units;

and assisting servo-motors disposed between said order-mixing units and said transfer members and permitting the aerodynamic couples resulting from variations of inclination or thrust to be overcome, the two said servo-motors each comprising two moving bell-crank levers actuated in opposite directions and each coupled respectively to two dynamometer couples inserted in the output rods of the transmission of orders derived from the thrust order-mixing units, said dynamometer couples producing electrical voltages which respectively excite two magnetic clutches, whereby, by virtue of the action of an external driving means, said bell-crank levers are displaced until said dynamometer couples produce identical voltages, that is to say are subjected to similar mechanical forces, so that the said device ensures the transmission, under all conditions of flight, of the operating orders from said piloting controls to said propulsion units.

2. A coupling device for aircraft of the type which take-off and land vertically, said aircraft comprising at least two tiltable propulsion units operated by piloting controls constituted by an attitude joy-stick for controlling pitching and rolling, a rudder-bar for the control of yawing movements, a general control acting simultaneously and in the same direction on the thrust of the propulsion units, a trim control acting on the general inclination of said propulsion units and an elevator control incorporated in said coupling device and permitting action on pitching in phases of flight having a horizontal component to be completed, said coupling device comprising:

a group of order-mixing units adapted to the function of movements defining the piloting of said aircraft and comprising a symmetrical order-mixing unit for the transformation of pitching orders and trim orders to orders of general inclination of the propulsion units; and anti-symmetrical order-mixing unit for the transformation of rolling and yawing orders to differential variation orders of thrust and inclination between the two propulsion units, the transfer functions depending on the position of said trim control; a thrust order-mixing unit, and an inclination order-mixing unit, intended to carry out respectively and in all cases the addition or subtraction between the general thrust or general inclination on the one hand and the differential thrust or the differential inclination on the other, these results being transmitted to the respective transfer members of said device for each of said propulsion units:

coupling members between said order-mixing units and between said units and said piloting controls of the aircraft;

respective transfer members for the propulsion units;

and assisting servo-motors disposed between said order-mixing units and said transfer members and permitting the aerodynamic couples which result from variations of inclination or thrust to be overcome;

said anti-symmetrical order-mixing unit for the transformation of rolling and yawing orders to orders of differential variation of thrust and inclination of the propulsion units comprising a base coupled mechanically by means of rods to the joy-stick and to the rudder-bar and tilting about two axes at right angles, bell-crank levers coupled mechanically to each other and corresponding rods coupling said order-mixing unit respectively to the other order-mixing units of said coupling device;

whereby said device ensures the transmission, under all conditions of flight, of the operating orders from said piloting controls to said propulsion units.

3. A coupling device for aircraft of the type which take-off and land vertically, said aircraft comprising at least two tiltable propulsion units operated by piloting controls constituted by an attitude joy-stick for controlling pitching and rolling, a rudder-bar for the control of yawing movements, a general control acting simultaneously and in the same direction on the thrust of the propulsion units, a trim control acting on the general inclination of said propulsion units and an elevator control incorporated in said coupling device and permitting action on pitching in phases of flight having a horizontal component to be completed, said coupling device comprising:

a group of order-mixing units adapted to the function of movements defining the piloting of said aircraft and comprising a symmetrical order-mixing unit for the transformation of pitching orders and trim orders to orders of general inclination of the propulsion units; and anti-symmetrical order-mixing unit for the transformation of rolling and yawing orders to differential variation orders of thrust and inclination between the two propulsion units, the transfer functions depending on the position of said trim control; a thrust order-mixing unit, and an inclination order-mixing unit, intended to carry out respectively and in all cases the addition or subtraction between the general thrust or general inclination on the one hand and the differential thrust or the differential inclination on the other, these results being transmitted to the respective transfer members of said device for each of said propulsion units:

coupling members between said order-mixing units and between said units and said piloting controls of the aircraft;

respective transfer members for the propulsion units;

assisting servo-motors disposed between said order-mixing units and said transfer members and permitting the aerodynamic couples which result from variations of inclination or thrust to be overcome;

said symmetrical order-mixing unit for the transformation of pitching and yawing orders to orders of general inclination of the propulsion units comprising a central shaft pivoting about a fixed axis and provided with a first group of two crank-arms mechanically coupling said unit respectively to the trim control and to the anti-symmetrical order-mixing unit and a second group of crank-arms fixed on the same central shaft and carrying a lever pivoting under the action of the joy-stick through the intermediary of a coupling rod, and transmitting this displacement to the inclination order-mixing unit;

whereby said device ensures the transmission, under all conditions of flight, of the operating orders from said piloting controls to said propulsion units:

4. A coupling device for aircraft of the type which take-off and land vertically, said aircraft comprising at least two tiltable propulsion uints operated by piloting controls constituted by an attitude joy-stick for controlling pitching and rolling, a rudder-bar for the control of yawing movements, a general control acting simultaneously and in the same direction on the thrust of the propulsion units, a trim control acting on the general inclination of said propulsion units and an elevator control incorporated in said coupling device and permitting action on pitching in phases of flight having a horizontal component to be completed, said coupling device comprising:

a group of order-mixing uints adapted to the function of movements defining the piloting of said aircraft and comprising a symmetrical order-mixing unit for the transformation of pitching orders and trim orders to orders of general inclination of the propulsion units; and anti-symmetrical order-mixing unit for the transformation of rolling and yawing orders to differential variation orders of thrust and inclination between the two propulsion units, the transfer functions depending on the position of said trim control; a thrust order-mixing unit, and an inclination order-mixing unit, intended to carry out respectively and in all cases the addition or subtraction between the general thrust or general inclination on the one hand and the differential thrust or the differential inclination on the other, these results being transmitted to the respective transfer members of said device for each of said propulsion units:

coupling members between said order-mixing units and between said units and said piloting controls on the aircraft;

respective transfer members for the propulsion units;

and assisting servo-motors disposed between said order-mixing units and said transfer members and permitting the aerodynamic couples which result from variations of inclination or thrust to be overcome;

said thrust order-mixing unit comprising a main base rotating about a fixed shaft on which is articulated a first lever coupled mechanically to the anti-symmetrical order-mixing unit and to a second T-shaped lever pivoting about a second shaft and actuating the respective operating rods of the transfer members for the control of the propulsion unit through the corresponding assistance servo-motors, while the main base is mechanically coupled to the thrust control of said piloting controls;

whereby said device ensures the transmission, under all conditions of flight, of the operating orders from said piloting controls to said propulsion units.

5. A coupling device for aircraft of the type which take-off and land vertically, said aircraft comprising at least two tiltable propulsion units operated by piloting controls constituted by an attitude joy-stick for controlling pitching and rolling, a rudder-bar for the control of yawing movements, a general control acting simultaneously and in the same direction on the thrust of the propulsion units, a trim control acting on the general inclination of said propulsion units and an elevator control incorporated in said coupling device and permitting action on pitching in phases of flight having a horizontal component to be completed, said coupling device comprising:

a group of order-mixing units adapted to the function of movements defining the piloting of said aircraft and comprising a symmetrical order-mixing unit for the transformation of pitching orders and trim orders to orders of general inclination of the propulsion units; and anti-symmetrical order-mixing unit for the transformation of rolling and yawing orders to differential variation orders of thrust and inclination between the two propulsion units, the transfer functions depending on the position of said trim control; a thrust order-mixing unit, and an inclination order-mixing unit, intended to carry out respectively and in all cases the addition or subtraction between the general thrust or general inclination on the one hand and the differential thrust or the differential inclination on the other, these results being transmitted to the respective transfer members of said device for each of said propulsion units:

coupling members between said order-mixing units and between said units and said piloting controls of the aircraft;

respective transfer members for the propulsion units;

and assisting servo-motors disposed between said order-mixing units and said transfer members and permitting the aerodynamic couples which result from variations of inclination or thrust to be overcome;

said inclination order-mixing unit comprising a main base articulated about a fixed shaft round which pivots a first lever coupled mechanically to the anti-symmetrical order-mixing unit, while a second bell-crank lever articulated about a second shaft rigidly fixed to the main base is coupled to the transfer members of the propulsion units through the corresponding assistance servo-motors;

whereby said device ensures the transmission, under all conditions of flight, of the operating orders from said piloting controls to said propulsion units.

References Cited

UNITED STATES PATENTS 3,106,369  10/1963  Borst _____ 244—52
3,193,218  7/1965   Ernst et al.

ANDREW H. FARRELL, *Primary Examiner.*